United States Patent
Sura et al.

(10) Patent No.: US 10,839,351 B1
(45) Date of Patent: Nov. 17, 2020

(54) AUTOMATED WORKFLOW VALIDATION USING RULE-BASED OUTPUT MAPPING

(71) Applicant: Amazon Technologies, Inc., Seattle, WA (US)

(72) Inventors: Hareendra Sura, Hyderabad (IN); William Wallace Allocca, Seattle, WA (US); Vemaganti Amith Vikram, Hyderabad (IN); Ohm Reddy Bomedi, Hyderabad (IN); Soumya Ranjan Maharana, Seattle, WA (US); Anil Kumar Senesetti, Hyderabad (IN); Hemanth Kumar Reddy Vallela, Hyderabad (IN)

(73) Assignee: Amazon Technologies, Inc., Seattle, WA (US)

(*) Notice: Subject to any disclaimer, the term of this patent is extended or adjusted under 35 U.S.C. 154(b) by 358 days.

(21) Appl. No.: 15/708,049

(22) Filed: Sep. 18, 2017

(51) Int. Cl.
*G06Q 10/10* (2012.01)
*G06Q 10/06* (2012.01)
*H04L 29/08* (2006.01)

(52) U.S. Cl.
CPC ........... *G06Q 10/103* (2013.01); *G06Q 10/06* (2013.01); *H04L 67/26* (2013.01)

(58) Field of Classification Search
CPC ......................................... G06Q 10/00–50/00
USPC .............................................. 705/7.11–7.42
See application file for complete search history.

(56) References Cited

U.S. PATENT DOCUMENTS

| | | | | |
|---|---|---|---|---|
| 5,974,392 A * | 10/1999 | Endo | ................. | G06Q 10/06311 705/7.14 |
| 6,795,832 B2 * | 9/2004 | McGeorge, Jr. | ..... | G06F 11/3688 |
| 7,299,244 B2 * | 11/2007 | Hertling | ................. | G06Q 10/06 707/694 |
| 7,984,043 B1 * | 7/2011 | Waas | ................... | G06F 16/8358 707/718 |
| 8,060,391 B2 * | 11/2011 | Freire | ................... | G06Q 10/063 705/7.11 |
| 8,751,273 B2 * | 6/2014 | Pinto | ..................... | G06Q 10/063 705/7.11 |
| 8,839,126 B1 * | 9/2014 | Tang | ....................... | G06F 21/51 715/764 |
| 8,887,124 B2 * | 11/2014 | Weber | ..................... | G06Q 10/06 717/104 |
| 9,274,782 B2 * | 3/2016 | Adderly | ................. | G06Q 10/06 |
| 9,292,631 B1 * | 3/2016 | Koh | ........................ | G06F 30/20 |
| 9,292,652 B2 * | 3/2016 | Aggarwal | ............. | G06F 30/398 |
| 9,350,747 B2 * | 5/2016 | McLarnon | ............. | H04L 63/14 |
| 9,477,703 B1 * | 10/2016 | Criss | ..................... | G06F 40/197 |
| 9,613,328 B2 * | 4/2017 | Lin | ................... | G06Q 10/06311 |

(Continued)

*Primary Examiner* — Alan S Miller
(74) *Attorney, Agent, or Firm* — Davis Wright Tremaine LLP

(57) ABSTRACT

Techniques describing methods and systems for validating different versions of a set of rules for performing automated workflow processes. Sets of input data, each disjoint from one another, are obtained that are optimized from inputs contained in data storage. A first output is produced using one or more of the sets of inputs as input to a first version of the set of rules, and a second output is produced using the one or more of the sets of inputs as input to a second version of the set of rules. The first output is compared with the second output and, in response to a determination that the first output and the second output do not match, an indication of inconsistency is recorded.

20 Claims, 10 Drawing Sheets

(56) References Cited

U.S. PATENT DOCUMENTS

| | | | | |
|---|---|---|---|---|
| 9,721,315 B2* | 8/2017 | Christen | ................ | G06Q 50/22 |
| 9,881,316 B2* | 1/2018 | Baldwin | ............ | G06Q 30/0243 |
| 2002/0184000 A1* | 12/2002 | Christodoulou | ....... | G06Q 10/10 |
| | | | | 703/22 |
| 2003/0120593 A1* | 6/2003 | Bansal | .................. | G06Q 20/10 |
| | | | | 705/39 |
| 2004/0078258 A1* | 4/2004 | Schulz | .................. | G06Q 10/06 |
| | | | | 717/104 |
| 2004/0111302 A1* | 6/2004 | Falk | ....................... | G06Q 40/02 |
| | | | | 705/4 |
| 2005/0027757 A1* | 2/2005 | Kiessig | .................. | G06F 16/10 |
| 2005/0234762 A1* | 10/2005 | Pinto | .................... | G06Q 30/02 |
| | | | | 700/44 |
| 2006/0026595 A1* | 2/2006 | Nakayama | ............. | G06Q 10/10 |
| | | | | 718/100 |
| 2006/0048094 A1* | 3/2006 | Kipman | ................. | G06Q 10/06 |
| | | | | 717/104 |
| 2008/0097816 A1* | 4/2008 | Freire | ................... | G06Q 10/10 |
| | | | | 705/7.26 |
| 2008/0256014 A1* | 10/2008 | Gould | .................... | G06N 5/025 |
| | | | | 706/48 |
| 2009/0113394 A1* | 4/2009 | Weber | ...................... | G06F 8/10 |
| | | | | 717/126 |
| 2009/0125362 A1* | 5/2009 | Reid | ...................... | G06Q 10/10 |
| | | | | 705/7.27 |
| 2010/0198799 A1* | 8/2010 | Krishnan | ............ | G06F 11/3696 |
| | | | | 707/702 |
| 2010/0235842 A1* | 9/2010 | Tamura | .............. | G06Q 10/0633 |
| | | | | 718/103 |
| 2010/0306412 A1* | 12/2010 | Therrien | ............. | G06F 11/1453 |
| | | | | 709/247 |
| 2011/0225565 A1* | 9/2011 | van Velzen | ............ | G06Q 10/06 |
| | | | | 717/114 |
| 2013/0238303 A1* | 9/2013 | Round | .................... | G06F 30/20 |
| | | | | 703/6 |
| 2013/0254772 A1* | 9/2013 | Corthesy | ............ | G06Q 10/0633 |
| | | | | 718/102 |
| 2014/0180743 A1* | 6/2014 | Lin | ................ | G06Q 10/063114 |
| | | | | 705/7.15 |
| 2014/0310714 A1* | 10/2014 | Chan | .................... | G06F 9/4881 |
| | | | | 718/102 |
| 2015/0178062 A1* | 6/2015 | Adderly | .................... | G06F 8/65 |
| | | | | 717/170 |
| 2016/0004622 A1* | 1/2016 | Kaulgud | ............ | G06F 11/3684 |
| | | | | 717/132 |
| 2017/0090994 A1* | 3/2017 | Jubinski | ............. | G06F 16/2471 |
| 2018/0053328 A1* | 2/2018 | Simonovic | ............. | G06F 8/433 |
| 2018/0144244 A1* | 5/2018 | Masoud | ................ | G16H 30/40 |

\* cited by examiner

AUTOMATED WORKFLOW VALIDATION USING RULE-BASED OUTPUT MAPPING

BACKGROUND

Computing services offered in various forms are becoming an increasingly popular solution to accommodate the growing needs of businesses and personal interests alike.

Upgrading or developing these cloud computing services to meet the ever-growing demands of customers is necessary to keep pace with competing services. For example, modifying or creating a new version of a set of rules for performing automated workflows may be desirable to address changes in technology, regulations, or consumer needs. A challenge associated with enhancing, updating, or upgrading these cloud computing services is minimizing errors or inconsistencies from one version to another version. Manual testing of a new version is impractical, subject to human error, and nearly impossible due to all the possible use cases and inputs associated with the services. Although tools have been developed to test upgrades and enhancements for new versions, most testing tools have thus far been insufficient to test all possible cases. Moreover, most of these tools require large amounts of computing capacity and time to thoroughly test each new version. A more thorough, efficient, and practical solution for testing is needed.

BRIEF DESCRIPTION OF THE DRAWINGS

Various techniques will be described with reference to the drawings, in which.

DETAILED DESCRIPTION

Figure 1:
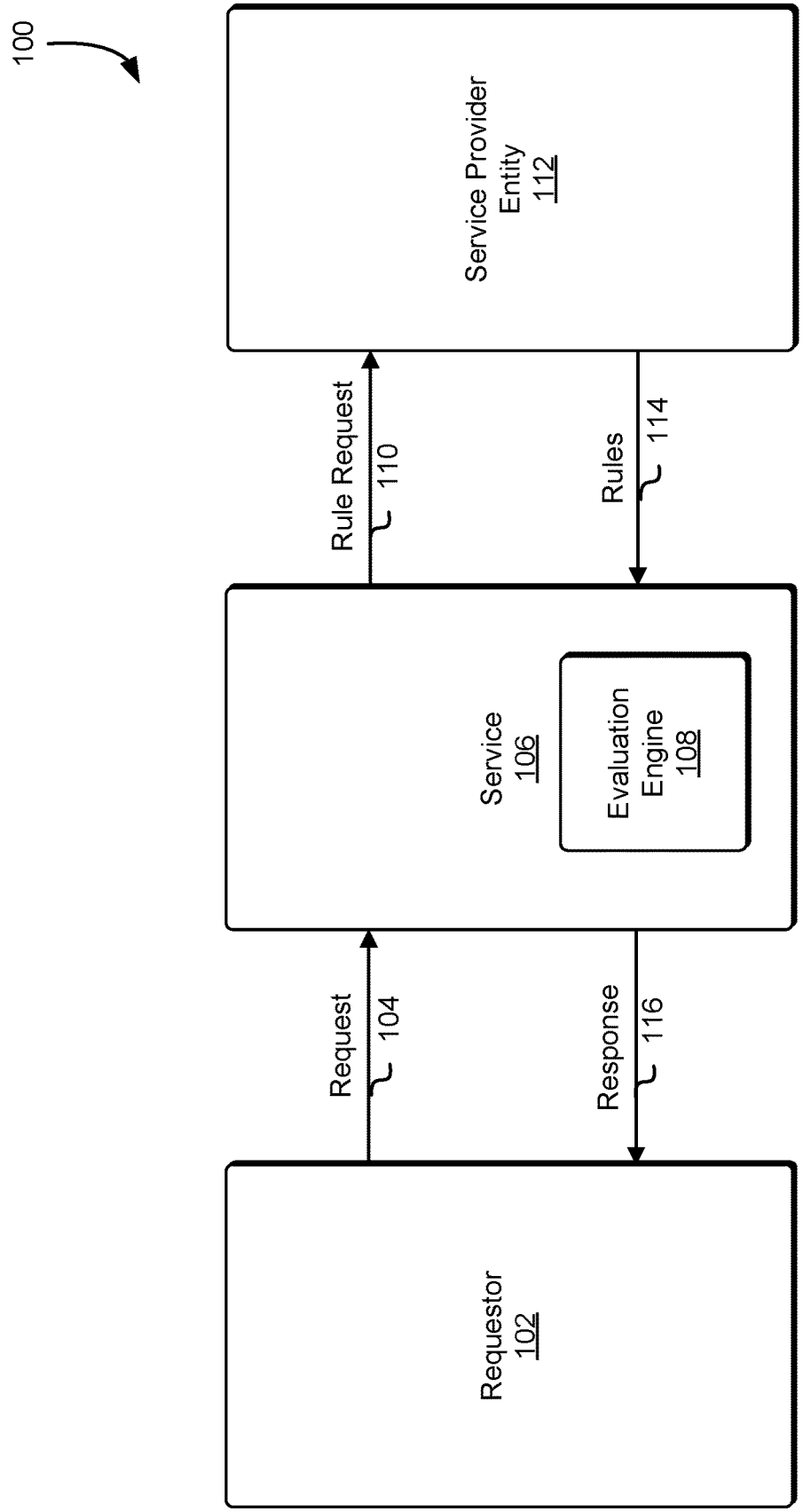
FIG. 1 shows an illustrative environment in which various embodiments may be practiced.

Techniques described and suggested herein include managing, evaluating, and performing automated workflow processes for providing services. The automated workflow processes may be initiated by a request received at a computing resource service provider. The automated workflow processes may involve performing an operation to provide a response in fulfillment of the request. Performance of the operation may be dictated or defined at least in part by a set of rules. Performance of the operations, as described herein, may include accessing memory to retrieve data and computing operations, such as evaluating data to produce an appropriate response to the request.

The set of rules may specify operations, tasks, and/or evaluations, and conditions and/or parameters that affect the outcome of the operation. The set of rules for the operation maybe based at least in part on operational logic that defines operations, tasks, evaluations, to be performed for the automated workflow process, or otherwise regulates the manner in which a response is determined. The logic may specify various considerations that are to be taken into account when performing the operation or evaluating the request. The set of rules may be subject to change by an entity having sufficient authority to do so. Due to a change in the set of rules, the operation maybe perform differently or the operation may yielded a response then a response yielded prior to implementation of the change in the rules.

A service of the service provider may receive requests from a requestor or requesting entity, such as customer, an application, or another service. The requestor may comprise computing systems and/or computing devices equipped to submit the request, via an interface or function call, for instance, to the service that causes the service to execute the automated workflow process. As described herein, the automated workflow process may be directed to executing one or more functions in fulfillment of the request (e.g., data storage, providing compute capacity, directory management, conducting e-commerce transaction). The workflow process may cause the service to interact with another service to fulfill the request. As a result of initiation of the workflow process, the set of rules may be accessed or obtained from data storage to fulfill the request.

The set of rules may specify tasks, steps, or determinations to be made in performing an operation or evaluating data associated with the request. The set of rules may specify parameters, conditions, factors, variables, dependent operations, or other aspects involved in performing an operation or evaluating a request. In response to the request, the service may obtain the set of rules related to performance of the automated workflow process for fulfillment of the request.

A service may be provided for validating and/or managing the set of rules. The service may be authorized to access memory, such as a collection of hard drives or a database, where the set of rules are maintained. The memory may include different versions of the set of rules that are appropriately indexed to allow the service to access and retrieve each version of the set of rules. The service may receive a set of rules from a user for storage in the memory and cause the set of rules to be stored in the memory upon a determination that the user has privileges sufficient to authorize storage of the set of rules. The service may also retrieve or obtain sets of rules and perform an analysis on the sets of rules to determine whether the sets conflict with each other. The analysis may be performed in response to receiving a request to analyze the sets of rules, the request specifying which sets of rules to compare. The analysis may involve performance of an operation or evaluation according to the set of rules using a set of inputs derived from input data. The set of inputs may be obtained or generated by determining one or more domains in the input data and, for each domain in the input data, determining a non-overlapping or disjoint set of elements that are members of the domain. The analysis may comprise applying each input in set of inputs to each set of rules to generate an output. Outputs corresponding to the input applied for each set of rules may be compared to determine inconsistencies between the sets of rules.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 shows an example of an environment 100 for executing an automated workflow process. A requestor 102 transmits a request 104, to a service 106 of a service provider, initiating an automated workflow process to fulfill the request 104. The requestor 102, which may be a computer system equipped (e.g., with instructions executable by one or more processors) to provide the request 104 to the service 106, may correspond to a user (e.g., customer) or service seeking to obtain services, information, or otherwise illicit a response from the service 106 in fulfillment of a request. The request 104 may be a request that is appropriately configured to be parsed or evaluated by the service 106 according to a predetermined protocol or using an interface provided by the service 106 (e.g., API). In one example the request is a web service request, although other formats of requests are considered as being within the scope of the present disclosure. The service 106 may be a service of a computing resource service provider configured to provide one or more services (e.g., web services and/or applications, e-commerce services) to customers, and whose services are configured to communicate with other services (e.g., of the service provider, third-party services) to fulfill requests, either directly or indirectly. The service may be implemented using one or more computer systems, such as servers, described below. In one embodiment, for example, the requestor 102 may be a user computing device (e.g., smartphone, personal computer, tablet computer) to the service 106 operating in accordance with input into a user interface. As another example, the requestor 102 may be a service of the service provider, comprising one or more computing resources, transmitting the request 104 to obtain information or to perform an operation as part of an automated workflow of the service provider. In such an example, the request may be submitted according to an automated process executing on the service.

The service 106 may include an evaluation engine 108 configured to evaluate the request 104 based on established logic associated with the automated workflow. A set of rules may comprise the logic and may define the manner in which the request 104 is to be evaluated and/or define computations for producing a response to the request 104. The set of rules may, for example, set forth operations to be performed or a library of dependent functions, conditions, variables, or queries for evaluating the request 104. The service 106 may submit a rule request 110 to a service provider entity 112 containing information sufficient to enable the service provider entity 112 to identify a set of rules 114, as described herein. The service provider entity 112 may be a service of the service provider entity or a repository for storing and retrieving one or more sets of rules, as described below. A service provider entity may be implemented by a computer system utilizing one or more computer systems (e.g., server computer systems), such as described in more detail below. The service provider entity 112 may obtain or retrieve the set of rules 114 and provide a response to the service 106 including information regarding the set of rules 114, such as the rules themselves or a reference to memory containing the set of rules.

The evaluation engine 108 may, using the set of rules 114, perform one or more operations or evaluations in the automated workflow process for fulfillment of the request 104.

In one embodiment, the automated workflow, according to the set of rules 114, may indicate operations related to performance of cryptographic services, authentication services, data storage services, compute capacity services (e.g., virtual machine provision), or electronic commerce services, by way of non-limiting example. Evaluation of the request 104 may include computing a digital signature according to an algorithm defined by the set of rules 114, or a price for a good, service, or other item offered for consumption indicated by constraints specified by the set of rules 114. In one embodiment, the set of rules 114 may specify steps for performing the automated workflow process. For instance, the set of rules 114 may specify steps for cryptographically authenticating a user or for providing a user with information regarding a good or service. The service 106 may generate and provide a response 116 to the requestor 102 based on a result of the automated workflow performed according to the set of rules 114.

Figure 2:
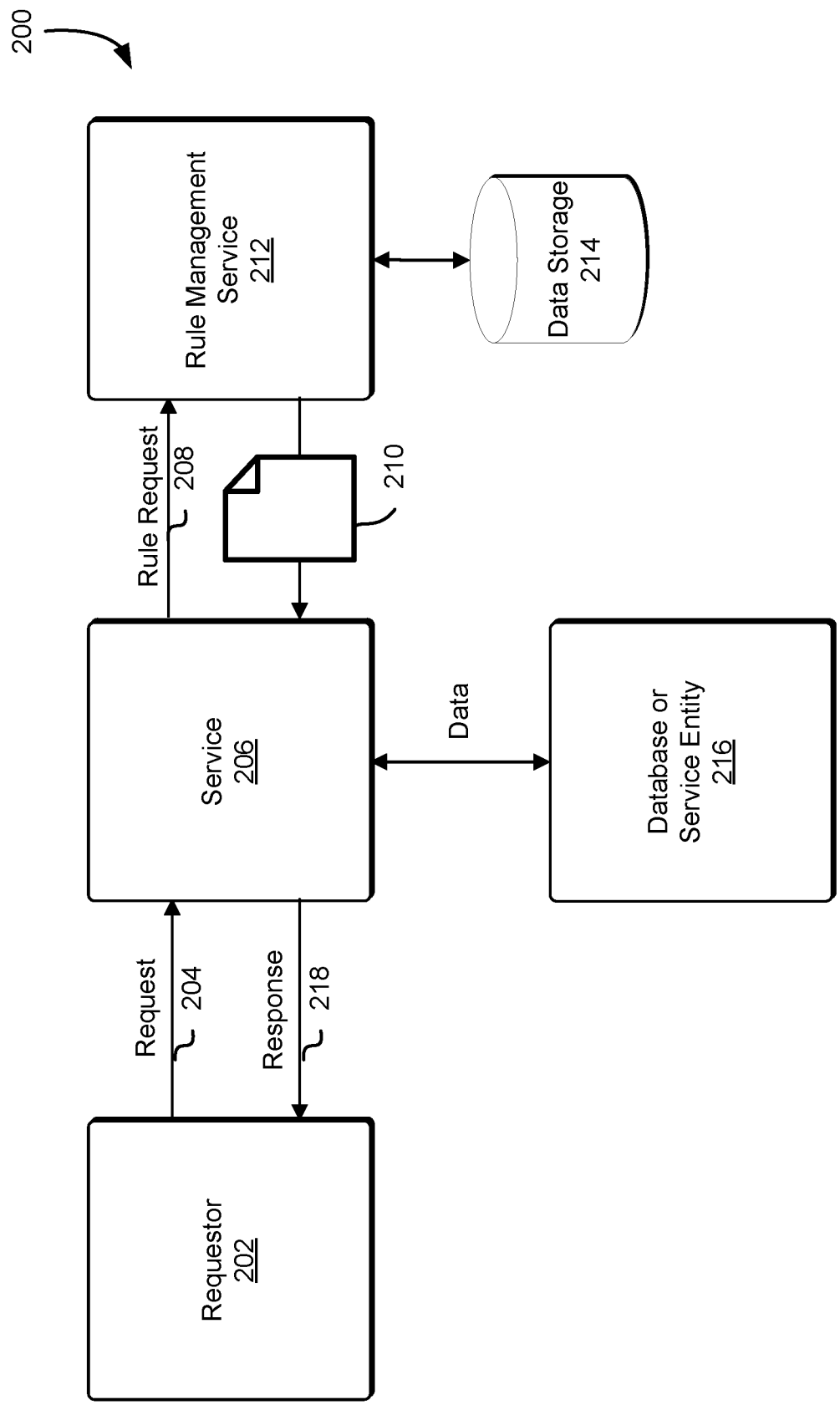
FIG. 2 shows an illustrative environment in which various embodiments may be practiced.

FIG. 2 shows an example of an environment 200 for executing an automated workflow process in accordance with at least one embodiment. A requestor 202 may provide a request 204, to a service 206 of a computing resource service provider, whose fulfillment includes performance of an automated workflow process, as described above with respect to FIG. 1. The request 204 may specify the workflow process to be performed or identify a result that the requestor 202 wishes to obtain (e.g., instantiating virtual machine, conducting e-commerce transaction). The request 204 may also specify or implicate one or more parameters involved in performance of the workflow process, such as information associated with the requestor 202 (e.g., username, location information) and/or an identifier of a product or service (e.g., good, virtual machine identifier).

The service 206 may interact with one or more service provider entities (e.g., by the submission of requests over a network and processing of received responses in a service-oriented architecture) in fulfillment of the request 204. The service 206 may, for instance, interact with a rule management service 212 to retrieve rule data 210 related to performance of the automated workflow. The service 206 may submit a request for rule data 208 to a rule management service 212 for the rule data 210. The rule management service 212 may be a service of a computing service resource provider, as described herein. The request 208 may include or reference information identifying the rule data to be retrieved—for example, the information may include an identifier of the rule data, a version of the rule data, or any other parameters or metadata related to the rules or rule data appropriate to particularly identify the data to be retrieved. The rule management service 212 may obtain the rule data from data storage 214 and provide the rule data 210 to the service 206. Obtaining the rule data 210 may include obtaining rules and definitions dependent from the rules requested, such as dependent rules and queries involved in the rules requested.

The data storage 214 comprises one or more volumes implement using one or more of: non-transitory computer-readable memory, such as volatile (e.g., Random-Access Memory, cache) or non-volatile memory (e.g. Read-Only Memory, Hard Disk Drives, solid-state drives, optical drives, magnetic tape). The data storage 214 may be included as part of the management service 212, or may comprise one or more storage devices separate from the management service 212. The data storage 214 may be part of a distributed storage system of a computing resource service provider that provides data storage and retrieval services to devices in various geographical locations. After obtaining the rules requested from the data storage 214, the management service 212 may provide (e.g., transmit or otherwise make available) the rules 210 to the service 206. Although the service 206 is described as communicating with the management service 212, such communications are not strictly necessary. In one embodiment, for example, the service 206 may interface with the data storage 214 to obtain the rules 210 without using the management service 212 as an intermediary.

The service 206 may then cause an automated workflow process to be performed in accordance with or using the rules 210. The automated workflow process may include performing one or more operations in accordance with the rules 210. The rules 210 may dictate one or more aspects of the automated workflow, such as the operations to be performed, the manner in which the operations are performed, parameters to be obtained, and other entities involved in performance of the operations. For example, the rules 210 may specify other services or data storage systems 216 of the service provider involved in performance of the automated workflow. In one embodiment, the rules 210 may be encoded in executable code or structured language (e.g., Perl, Java, Javascript, HyperText Preprocessor ("PHP"), Hypertext Markup Language ("HTML"), Extensible Markup Language ("XML")) that may cause a computing entity to perform one or more operations using one or more parameters.

In one embodiment, the service 206 may interface with a service or database 216 for storing parameters specified by or associated with the request 204, such as the parameter databased discussed below in greater detail. The service 206 may provide a response 218 to the requestor 202 related to performance of the workflow process, such as providing information related to the request 204 or providing a response confirming performance of a process related to or specified in the request 204. The rules 210, however, are subject to change by entities having authority to modify the rules 210. It is desirable to ensure that rules 210 produce a consistent result in both their pre-modification and post-modification versions. Customers, for example, may become upset if an automated workflow process operates differently or produces an unexpected or erroneous result because of the modification. Moreover, systems and/or services of the service provider may experience performance issues related to latent effects of the modifications. Accordingly, there is a need to verify that modifications to the rules 210 will not adversely affect associated automated workflow processes.

Figure 3:
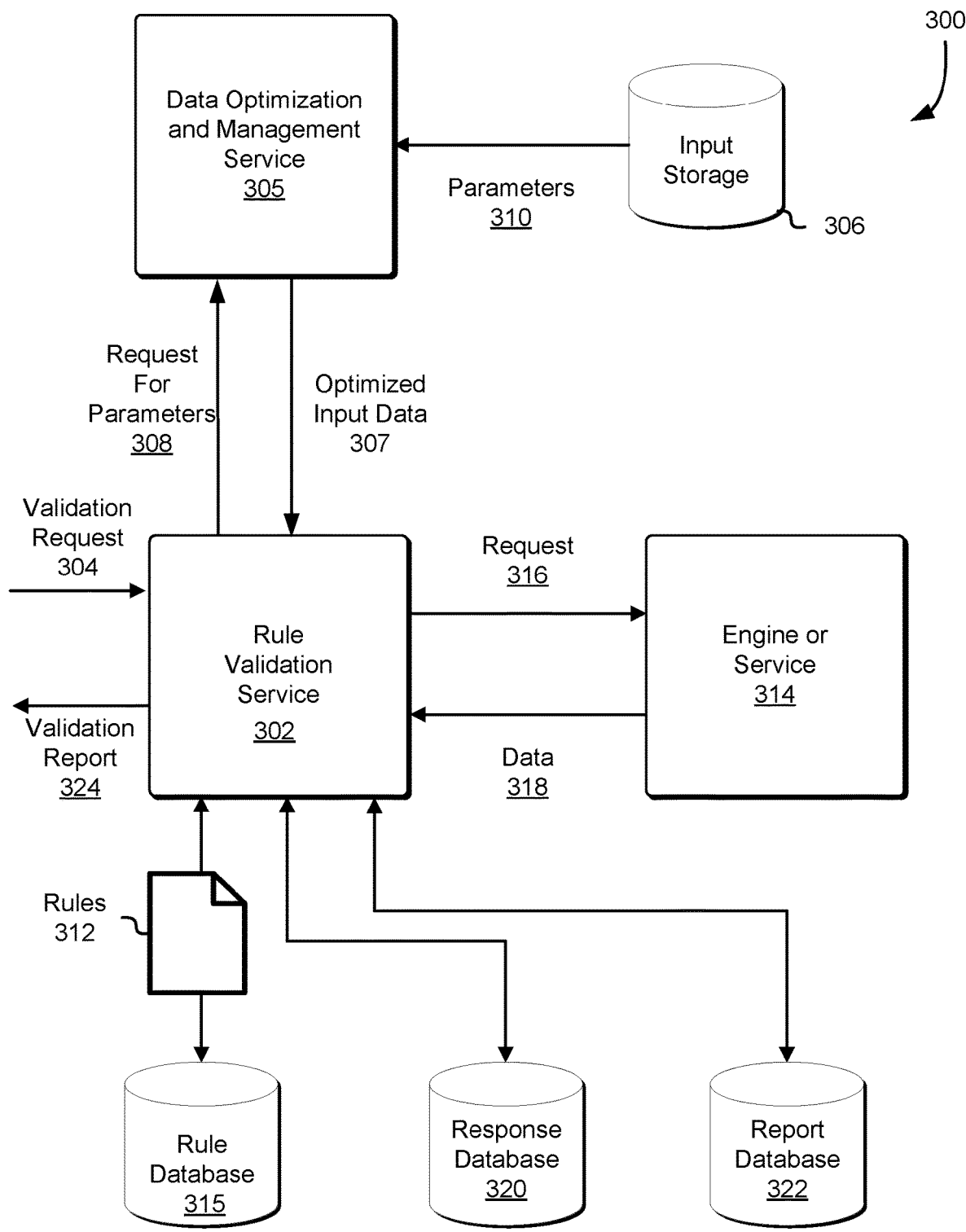
FIG. 3 shows an illustrative environment in which various embodiments may be practiced.

FIG. 3 is an illustrative environment 300 for validating different versions of a set of rules for performing automated workflow processes. The various entities, services, and data storage (e.g., databases and other memory as described herein) described with respect to FIG. 3 may be entities, services, and data storage of the service provider. Moreover, the entities, services, and data storage may comprise a collection of computing resources (e.g., servers, computing devices) operating under the control or agency of the service provider. A rule validation service 302 of the environment 300 may be a service of the service provider comprising one or more computing resources (e.g., server, computing device). The validation service 302 may be a collection of one or more computing resources (e.g., servers, computing devices) that are configured to analyze different versions of a set of rules to determine whether the different version produce inconsistent, conflicting, or incompatible results. The validation service 302 may be a subservice of the rules management service described above with respect to FIG. 2, or may be a separate service. The analysis may be performed by generating an set of inputs comprising a plurality of domains, determining a result for each combination of the set of inputs for each version of the set of rules, and comparing the results corresponding to each combination of inputs to generate a report.

The validation service 302 may receive a validation request 304 to validate a set of rules. The request 304 may be provided by a service of the service provider or by a user associated with the service provider, such as a developer. The request 304 may specify the set of rules to be validated and may specify one or more versions of the set of rules. The validation service 302 may send, to a data optimization and management service 305, a request for parameters 308 used to validate the set of rules. The request 308 may specify information usable to identify input parameters for the set of rules. The request 308, for example, may include information identifying the set of rules, and which versions of the set of rules should be tested. The optimization service 305 may obtain an optimized set of inputs for use in testing the set of rules. The optimization service 305 may obtain inputs that were previously used in association with the set of rules, such as user inputs that were actually received from users (e.g., existing use cases). The existing use cases may have been stored in input data storage 306 for use in validating the set of rules. In one embodiment, the request 308 may include an identifier of the set of rules, and the optimization service 305 may retrieve, from the input storage 306, parameters or inputs previously submitted, used, or otherwise involved in performance of an automated workflow using the set of rules corresponding to the identifier. The input data storage 306 may provide one or more parameters 310 to the validation service 302 in response to the request 308. Input data storage 306 is a data storage area for storing input sets, and may comprise computer-readable memory, such as volatile (e.g., Random-Access Memory, cache) or non-volatile memory (e.g. Read-Only Memory, Hard Disk Drives, solid-state drives, optical drives, magnetic tape). The input data storage 306 may include a database for storing and retrieving data in a relational manner, and may implement one or more systems for relational data stream management, such as Structured Query Language (SQL), Perl, and the like.

The optimization service 305 may obtain the input parameters and generate a disjoint-set data structure for each domain in the input parameters. The disjoint-set data structure corresponds to a set of elements partitioned into a number of disjoint or non-overlapping subsets. Consider as an illustration a first set of elements comprising {A, B, C}, a second set of elements {E, F}, and a third set of elements {E, G, H}. The second set of elements is disjoint from the first set of elements because no elements of the second set are in common with the first set, but the second set is not disjoint with the third set because an element 'E' is shared in common there between. According to this property, the set of elements for each input domain is filtered into a set of elements that are exclusive within the input domain. After generating the disjoint-set data structures for the input domains, the optimization service 305 may generate an optimized input data file 307 containing every possible combination of sets of inputs for the domains. The number of inputs is equal to the cross product of the number of disjoint elements in each domain. For example, if there are three domains—a first domain comprising five elements, a second domain comprising three elements, and a third domain comprising eight elements—then there are 120 (i.e., 5*3*8) possible combinations. The process for generating every possible input contained in the optimized input data file is further discussed below with respect to FIG. 7. The optimization service 305 may provide the optimized input data file 307 to the validation service 302, and/or store the data file 307 in storage, such as the parameter database.

The validation service 302 may cause the set of rules to be evaluated using one or more inputs in the optimized input data file 307 obtained. The validation service 302 may obtain one or more versions of the set of rules 312 to be validated from a rules database 315 or rules management service, as described above with respect to FIG. 2. The validation service 302 may interact with an engine or service 314 to perform one or more operations in the automated workflow process in accordance with the one or more versions of the set of rules 312 and in view of the set of parameters 310 obtained. For example, the validation service 302 may submit a request 316 including the versions of the set of rules 312 and one or more inputs in the optimized input data file 307. The engine or service 314 may evaluate one or more queries or perform one or more operations or tasks according to the set of rules 312 and using one or more inputs in the optimized input data file 307 provided. The engine or service 314 may be an independent entity or a component of a service that is configured to evaluate the one or more queries or perform the one or more operations. The engine or service 314, for example, may be a service that is configured to perform distributed processing and storage on one or more clusters of computing resources including processors and memory, such as described below.

The engine or service 314, for instance, may be a service configured (e.g., with processor-executable instructions) to instantiate virtual machines in an environment of the service provider, or execute an electronic commerce service. After evaluating the one or more queries or performing the one or more operations, the engine or service 314 may provide data 318 related to the evaluation or performance. In the scope of an electronic commerce service, for example, the data 318 may be the result of evaluating a set of rules 312 relating to providing a price for a good based on various factors, such as origin and/or type of the good, and location of the customer. As another example, the data 318 may specify a set of characteristics related to performance of operations defined by the set of rules 312 for instantiating a virtual machine, such as a period of time to instantiate the virtual machine and computing capacity (e.g., processing power, memory) that the virtual machine can provide. The validation service 302 may submit additional requests 316 to the engine or service 314 using different parameters in association with the set of rules to obtain additional data 318. The additional data 318 may be used to determine additional data 318 characterizing a variety of results that may be obtained by the engine or service 314 using the set of rules 312 provided. For example, the validation service 302 may submit, to the engine or service, additional requests 316 specifying different combinations of parameters to determine data 318 generated based on the performance of operations or the evaluation of the queries according to the set of rules 312. The validation service 302 may also submit requests 316 specifying a different version of the set of rules with various combinations of the parameters 310 to determine whether the different set of rules produces data 318 indicating an inconsistent, conflicting, or incompatible result.

The validation service 302 may store the data 318 obtained from the engine or service 314 in a response database 320. The data 318 may be stored in the response database 320 in association with the set of rules and one or more inputs in the optimized input data file 307. After the validation service 302 has tested a sufficient number of inputs in the optimized input data file 307 combinations of the parameters 310 with the different versions of the sets of rules, the validation service 302 may generate a validation report 322 indicating one or more of the results of the testing based on the data 318. For instance, the report may indicate that the different versions of the set of rules produced one or more inconsistent results, and may indicate the associated combination of inputs and/or operations that generated the inconsistent results. The validation service 302 may provide the validation report 324 report to the requesting entity and/or may store the validation report in a report database 324. The rule database 315, the response database 320, and the report database 322 may be data storage for a distributed storage system of the service provider.

Figure 4:
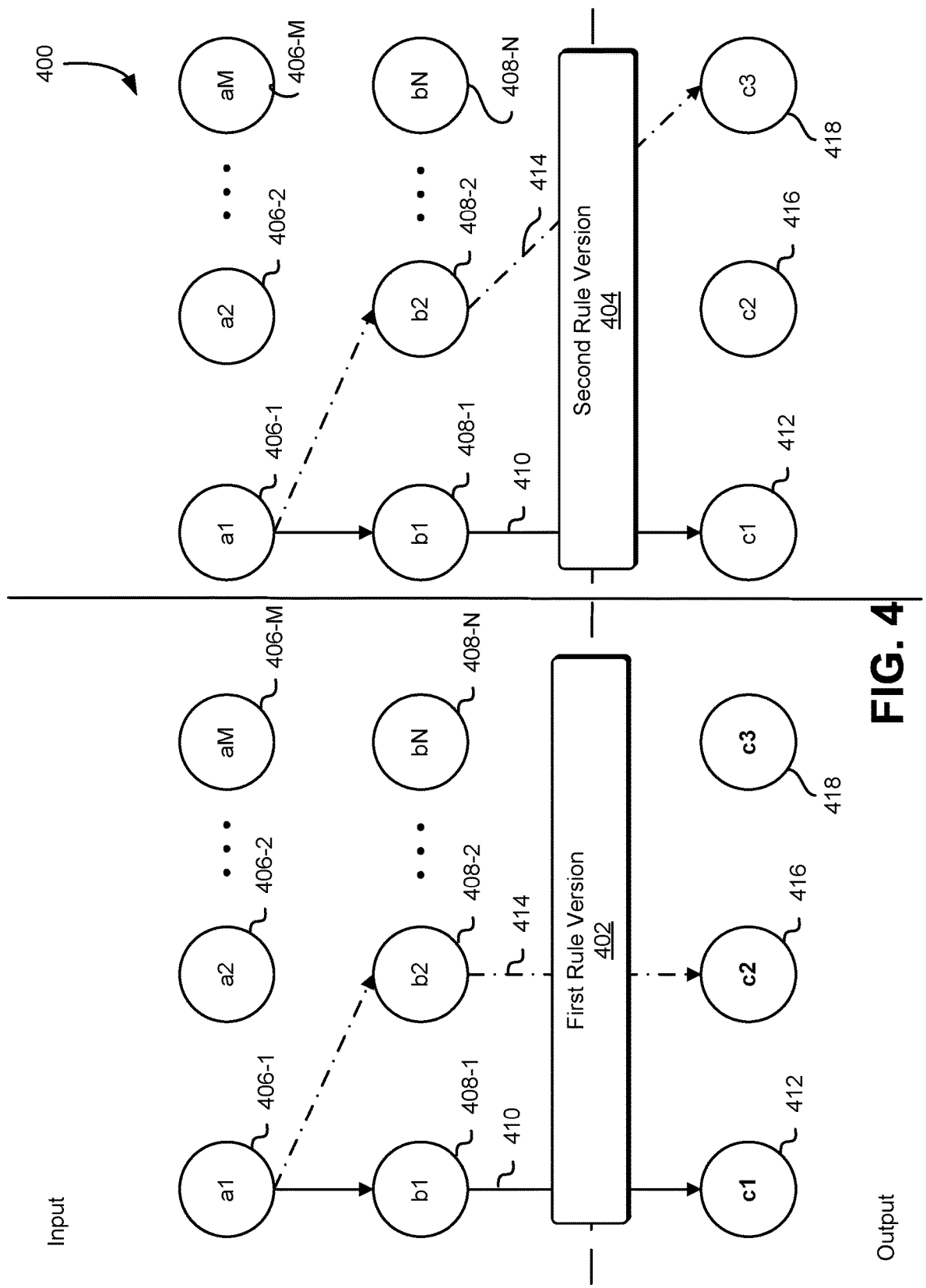
FIG. 4 shows an illustrative diagram in which different outputs are generated using different versions of a set of rules for identical inputs.

FIG. 4 is an illustrative diagram 400 demonstrating a process for detecting inconsistent results generated by applying a same combination of inputs to different versions of a set of rules. The diagram 400 includes a first version 402 of a set of rules, as previously described, and a second version 404 of the set of rules. A first input domain, identified by the coefficient 'a', includes a first input 406-1, a second input 406-2, etc., to a last input 406-M. The inputs in the first domain for the first rule version 402 are each identical to a corresponding input in the first domain for the second rule version 404. The first input 406-1 for the first rule version 402 is identical to the first input 406-1 for the second rule version, for example. A second input domain, identified by the coefficient includes a first input 408-1, a second input 408-2, etc., to a last input 408-N. As described above with respect to the first input domain, the inputs in the second domain for the first rule version 402 are each identical to a corresponding input in the second domain for the second rule version 404. The number of inputs M for the first domain 'a', may be different than a number of inputs N for the second domain 'b'. The inputs for each domain are disjoint such that none of the inputs in a domain are identical to any of the other of the inputs in the domain. For instance, none of the first domain inputs 406 are identical to any of the other first domain inputs.

Every input from each domain is combined with every input from the other domains as inputs to the first rule version 402 to ascertain a set of outputs. As shown in FIG. 4, the first input 406-1 of the first domain is used in combination with a first input 408-1 of the second domain as an input 410 to the first rule version 402. Evaluations or operations performed according to the first rule version 402 using the input 410 produces a first output 412, represented as 'c1'. A second result 416 is produced using a second input 414, comprising the first input 406-1 of the first domain in combination with the second input 408-2 of the second domain, as input to the first rule version 402. This process is repeated until the first input 406-1 is used in combination with every one of the inputs for the second domain 'b' to produce a set of outputs. Thereafter, a second input 406-2 ('a2') is used in combination with every one of the inputs for the second domain 'b' to augment the set of outputs. This process is repeated until every input of each domain has been used in combination with every input from every other domain inputs to produce a corresponding output using the first rule version 402. It should be noted that, although every input combination is mutually exclusive to the other input combinations, the outputs produced are not necessarily mutually exclusive from one another.

The same process is repeated for the second rule version 404 to ascertain whether any outputs are produced that are inconsistent with the output results produced in accordance with the first rule version 402. For example, the second rule version 404 produces the same first output 412 using the same first input 410. However, the second rule version 404 produces a third output 418 different from the second output 416 using the same second input 414. It is therefore determined that the second rule version 404 produces at least one output that is different from an output that would be produced from the first rule version 402 using the same input.

Several exemplary descriptions are provided below for processes, systems, and environments for validating rules for performing automated workflow processes. The exemplary descriptions are described with reference to automated workflow processes for electronic commerce services; however, those of ordinary skill in the art will appreciate that the workflow processes may relate to other applications, such as cryptographic applications, providing compute capacity, data storage services, and other applications. The electronic commerce automated workflow processes may be performed in association with a service provider receiving a request to provide information regarding a good or service, such as determining the sales tax on a good.

Figure 5:
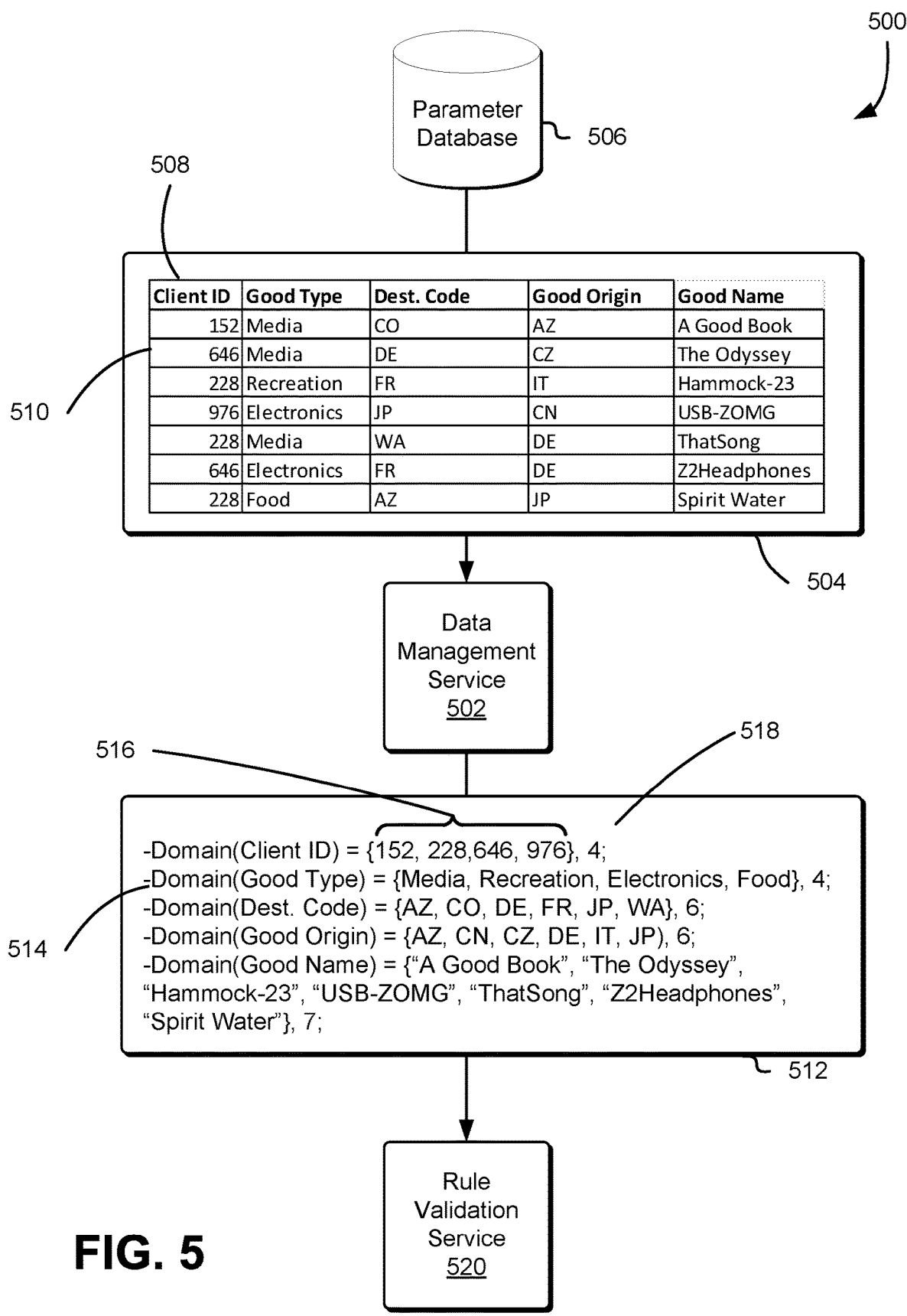
FIG. 5 shows an illustrative example of an optimization for input data.

FIG. 5 illustrates an environment 500 for optimizing a set of inputs to a set of rules. The optimization may be performed by the data management service described herein, or may be part of another service, such as the rule validation service. Optimizing the set of inputs involves determining an exhaustive set of inputs in each domain for a plurality of domains used to produce outputs for a set of rules. A data management service 502 obtains input data 504 from a parameter database 506, as described above with respect to FIG. 3. The input data 504 may include one or more input header 508 and a set of inputs 510 for each input header. The input headers 508 are each a domain comprising a set of domain objects or set of elements for the domain. Each domain comprises an open set of domain objects that were used as inputs for the operations or sets of rules described herein. For example, the domains may be considered as categories of inputs used by previous users or entities in performance of the automated workflow processes. Each domain may comprise domain objects or elements that are of a single data type—for example, each domain may comprise a series of string objects, integer objects, or floating point objects. As an example, the input data 504, for example, includes five input headers (Client ID, Good Type, Destination Code, Origin of Good, Name of Good) and seven inputs for each domain. The input data 504 may be obtained in association with requests for purchase information received by the service provider from customers, and stored in the parameter database 506. The input data 504 may be organized in an array structure or spreadsheet structure by which the input elements may be associated with the corresponding input domain.

The data management service 502 may perform a data optimizing process for optimizing the input data 504 into disjoint-set data structure, also known as a union-find data structure or a merge-find set. The optimized domain sets 512 include five input domain data structures 514 each corresponding to the input headers 508. Each of the input domains may have a disjoint set of elements 516 corresponding to the inputs 510 of the input data 504. The data structures 514 may also include a parameter 518 corresponding to the number of disjoint elements 516 in each domain. The management service 502 may provide the domain sets 512 to a rule validation service 520, as described herein.

Figure 6:
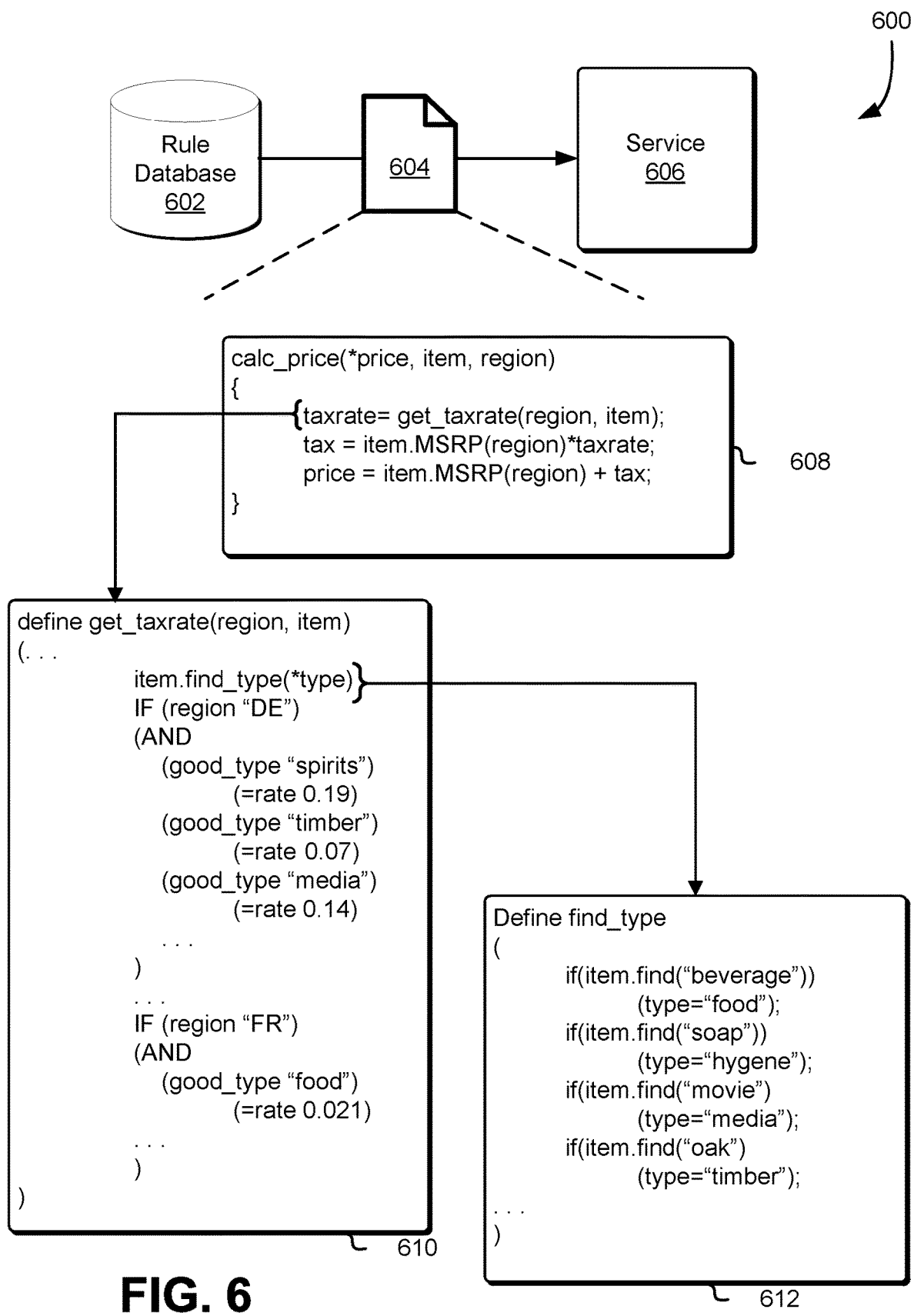
FIG. 6 shows an illustrative example for handling a set of rules related to an automated workflow process.

FIG. 6 is an illustrative example of an environment 600 for obtaining one or more sets of rules. A rule database 602 storing a set of rules 604 may provide the set of rules 604 to a service 606 of a service provider, such as the rule validation service described herein. The set of rules 604 specify one or more operations, tasks, or evaluations to perform, as well as parameters, conditions, definitions, and dependent rules for performance of the automated workflow. The set of rules 604 in this example relate to an automated workflow for obtaining a price of a good based on several parameters, conditions, and logic defined by the set of rules 604. The set of rules 604 provided include a set of operations 608 to perform to obtain the price of an item in response to a request received from a customer. The set of operations 608 include determining a tax rate based at least in part on parameters related to the item and a location or region of the customer. Evaluating the set of operations 608 may involve reference to other rules. For example, the tax rate may be defined by a definition 610 specifying logical conditions for determining the tax rate. The tax rate may vary based not only on the region of the customer, but also the type of good or the origin of the good. The definition 610 may specify one or more dependent definitions or operations 612 to be evaluated or performed to provide an accurate response to the customer. The definition 610 may specify a set of tax rules for one or more regions that reflect regulations or laws for how taxes should be determined for each region. However, these tax rules are subject to change over time and so the tax rules for one year may produce a different result than the tax rules for another year. The rule validation service described herein may evaluate the set of rules 604 using the disjoint data structures described above with respect to FIG. 5. Although the environment 600 is described with respect to a set of rules for conducting a business transaction in an electronic commerce environment, the process and system for validating sets of rules may be applied to any rules-based system and is not particularly limited to business transactions.

Figure 7:
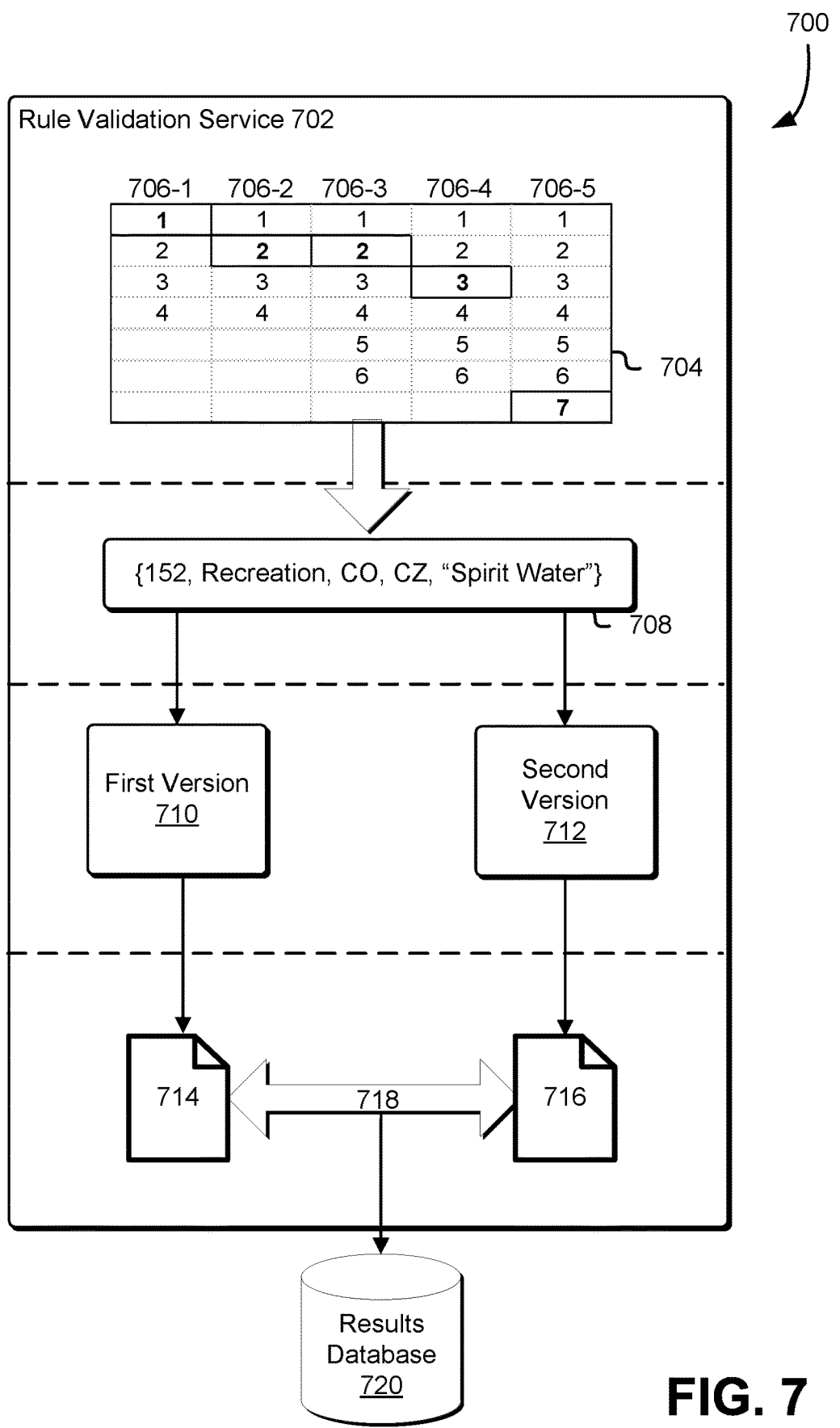
FIG. 7 shows a second illustrative example of validating a set of rules.

FIG. 7 is a diagram 700 illustrating an approach that can be implemented by a rule validation service 702, as described herein. The rule validation service 702 may implement a counting data structure 704 stored in memory of the validation service 702 for keeping track of each distinct combination of inputs from the optimized domain sets 512 discussed above with respect to FIG. 5. The counting data structure 704 may have a set of individual counters 706 each corresponding to a combination of the input elements from the domain sets to be used as parameters in the set of rules. Each individual counter 706 in the set of counters corresponds to a different one of the domains in the domain sets, and each counter 706 may have a maximum possible value corresponding to the number of disjoint elements in the corresponding domain. For example, the first counter 706-1 corresponds to the "Client ID" domain of FIG. 5, the second counter 706-2 corresponds to the "Good Type" domain, and so forth. When beginning a validation process, the validation service 702 may initiate the values of the counter 706 to a lowest value (in this example, the value one) and may specify—for each of the counters 706—a highest possible value. For instance, the counter 706-5 corresponding to "good name" is a domain having seven elements, so the highest possible value for the counter 706-5 is the value seven. The validation service 702 may obtain, from the domain sets (e.g., domain sets 512), a set of input elements 708 respectively corresponding to the current values of the counters 706 to be used as inputs for the different versions of the set of rules to be evaluated. The values "1, 2, 2, 3, 7" for the counter 706 depicted in FIG. 7, for instance, respectively correspond to the set of elements 708 "{152, Recreation, CO, CZ, "Spirit Water"}" of the domain sets discussed above with respect to FIG. 5.

The validation service 702, starting with the initial values for the data structure 704, may obtain the set of elements 708 corresponding to the counters 706 and use the set of elements 708 as inputs to a first version 710 of a set of rules and a second version 712 of the set of rules. The second version 712 of the set of rules may be different from the first version 710 in one or more aspects. The second version 712 may contain one or more aspects that are different than the first version 710. For example, the second version 712 may involve performance of operations that are modified versions of the operations in the first version 710, or may contain additional operations not contained in the first version 710. The second version 712 and first version may differ in that they involve different numerical constants, such as different tax rates, or may differ in that logical conditions for performing the operations may be different, such as by containing different conditions for classifying goods or services. The process for validating rules takes into account that one of the versions of the set of rules may be larger or have a different size than the other version of the set of rules, allowing for a validation process that is scalable.

For each set of elements 708 inputted, the validation service 702 may obtain a first output 714 using the first version 710 of the set of rules and a second output 716 using the second version 712 of the set of rules. The validation service 702 may compare 718 the first output 714 and the second output 716 to determine whether the outputs are different. The validation service 702 may store a result of the comparison 718 in a results database 720, such as the results database described in FIG. 3. The result may be stored in the database 720 in association with the set of elements used to obtain the first output 714 and the second output 716, and/or in association with identifiers respectively identifying the first version 710 and the second version 712 of the set of rules used to produce the outputs. In one embodiment, the validation service 702 may store the first output 714 and the second output 716 in the database 720 before performing the comparison 718. The validation service 702 may thereafter perform a plurality of comparisons between the first outputs 714 and the second outputs 716 stored on the database 720 to produce a report identifying different results produced.

After obtaining the set of elements 708, the validation service 702 may adjust the values of one or more of the counters 706 to obtain the next combination of the set of elements 708. For example, validation service 702 may increment the value of the counter 706-5, which corresponds to a least significant digit of a number, after obtaining the set of elements 708. However, in this instance, the counter 706-5 cannot be further incremented as it is already at its maximum value. Therefore, the validation service 702 may reset the current counter 706-5 to its lowest value, "1", and increment an adjacent counter (i.e., counter 706-4) to "4". Modifying the counter 706 may be performed after obtaining the set of elements 708 and outputs 714 and 716 obtained for each of the set of elements until each of the counters 706 are at the maximum value—"4, 4, 6, 6, 7" in this case. When the counters 706 are each at their maximum value and the outputs 714 and 716 have been obtained from the set of elements 708 corresponding to the counters 706, the validation service 702 may generate a report detailing any differences between the outputs 714 and 716. The cross product of the possible combinations may be computed by dating the cross product of the number of elements in the domains. Namely, the product of (4*4*6*6*7), which is 4032 possible combinations.

Although the validation service 702 is described as incrementing the counter 704 to produce every possible combination of sets of inputs, the validation service 702 may instead obtain an optimized disjoint-data structure from the input data. In particular the validation service 702 may send a request to an input optimization service, such as the input service described above in FIG. 3. The request may specify input data to be used to generate the disjoint-data structure, or the optimization service may retrieve the input data based on other parameters included in the request, such as an identifier of the set of rules. The optimization service may increment through the counter to determine every possible combination of inputs for the domains, and may store each combination in a disjoint-set data file specifying each possible combination. The validation service 702, upon receiving the disjoint-set data file, may obtain sets of elements 708 consecutively from the disjoint-set data file and test the sets of elements with the first version and the second version of the set of rules.

The validation service 702 may analyze the results of the comparison 718 to determine whether the result corresponds to an inconsistent or conflicting result. The validation service 702 may determine that the inconsistent result is inconsistent or conflicting based on a difference between the first output 714 and the second output 716, or based on one of the first output 714 and the second output 716 being incorrect or questionable—for example, generating a negative numerical value where a positive numerical value is appropriate. The validation service 702 may generate a notification for detection of an inconsistent result, or may generate a report comprising the results of a set of comparisons. The validation service 702 may determine that a set of rules has passed or failed validation based on the results. Alternatively, the validation service 702 may allow a user to determine or decide whether a set of rules passes or fails validation. For example, the notification or report may notify the user that a difference between the outputs was detected, or that an output is incorrect or questionable. The user may be provided with an option or prompt determining whether one of the sets of rules is valid or invalid based on the notification or report provided. The validation service 702 may determine that the one of the sets of rules is valid or invalid based on the results of one or more of the comparisons, or based upon the results of a report generated based thereon.

Figure 8:
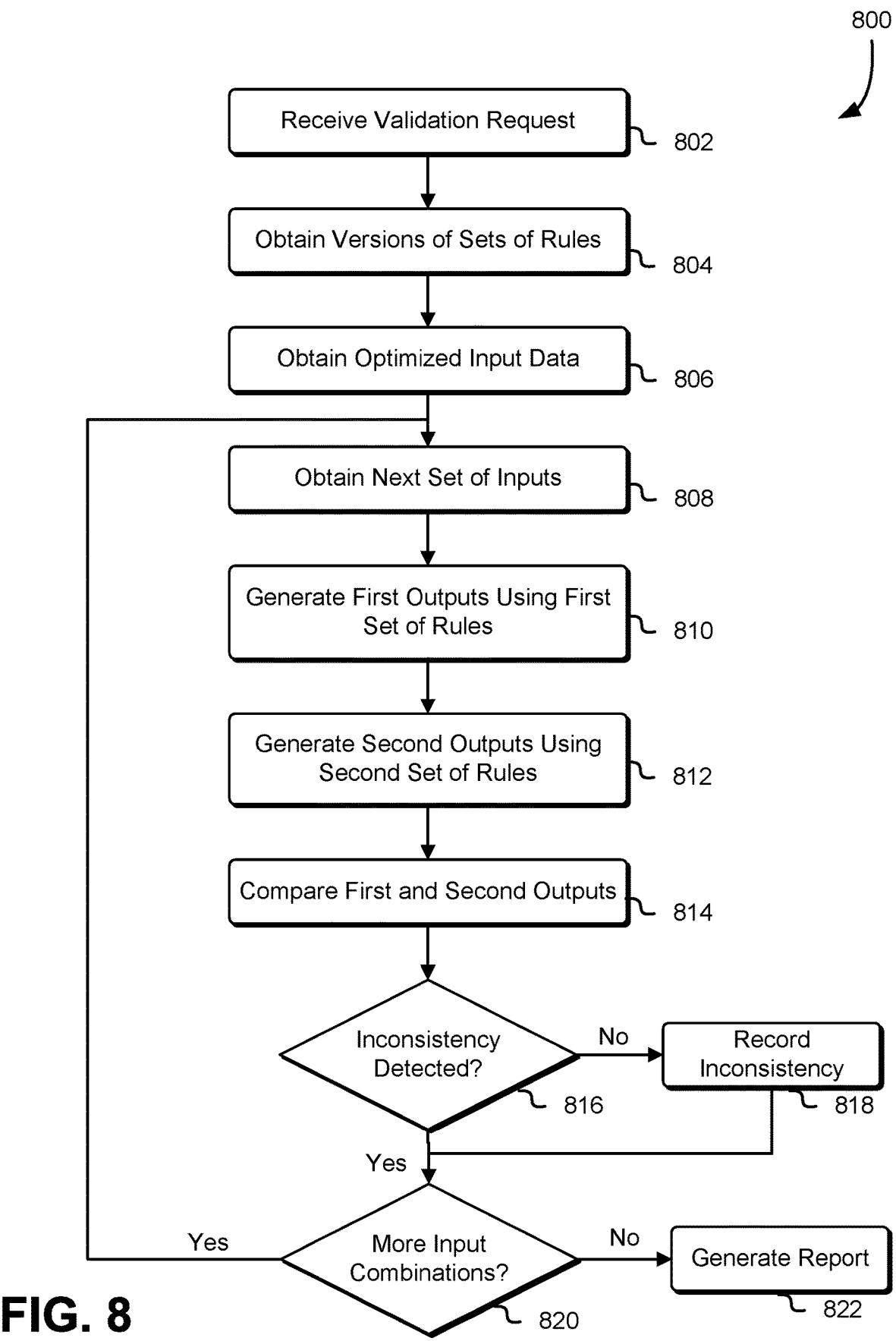
FIG. 8 shows a process for determining inconsistency between sets of rules.

FIG. 8 is an illustrative example of a process 800 for validating different versions of a set of rules. The process 800 may be performed by a service of a computing resource service provider, such as a rule validation service described above. The validation service may receive 802 a validation request identifying different versions of a set of rules to analyze, as described above with respect to the validation request 304 of FIG. 3. The validation service may then obtain 804 the first version and the second version of the set of rules to be analyzed from a rules database or a rules management service, for example. The first and second version of the set of rules may be obtained in accordance with the retrieval of the set of rules 210 or 312 described herein. The validation service may obtain input data and cause the data to be optimized 806 for each input domain, as discussed above with respect to FIG. 5. The validation service may send a request to an input optimization service causing the service to retrieve raw input data from input parameter data storage, such as a database as described herein, and generate a disjoint-set data structure from the input data.

The validation service may obtain 808 the set of input elements, as described about with respect to FIG. 7, from the disjoint-set data structure. The validation service may generate 810 a first output at least by providing the first set of input elements as inputs to the first version of the set of rules, then may generate 812 a second output at least by providing the set of input elements as inputs to the second version of the set of rules. The first output may be compared 814 with the second output to determine 816 whether the outputs match. If the first output and the second output do not match, the validation service may record 818 an inconsistency between the outputs. The first output and the second output may be generated and compared in accordance with the operations described above with respect to FIG. 7. The inconsistency may be recorded in association with identifiers identifying the first version of the set of rules and the second version of the set of rules. The validation service may then determine 820 whether there are sets of input elements representing additional combinations of inputs to be tested. For example, the validation service may look at the disjoint-set input file to determine whether there are sets of inputs that have not yet been tested in association with the different versions of the set of rules. If so, the validation service may return to step 808 to obtain an additional set of inputs. If no additional input combinations remain to be tested, the validation service may generate 822 a report documenting results of the comparisons, including documenting any inconsistencies recorded.

Figure 9:
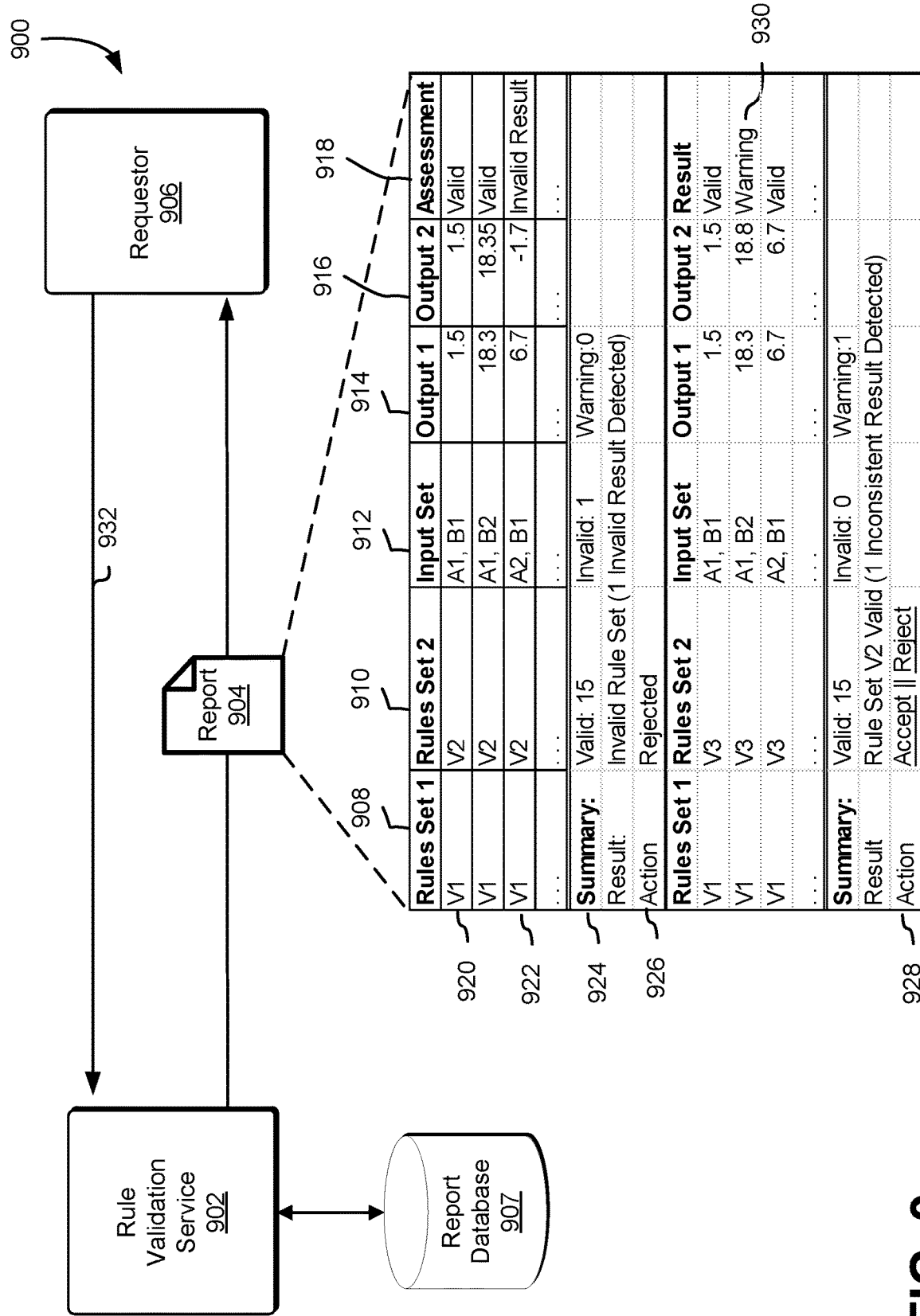
FIG. 9 shows an illustrative example of a report provided for validating a set of rules.

FIG. 9 shows an illustrative example of a diagram 900 for providing a notification or report as a result of a validation process for validating a set of rules. A rule validation service 902, in response to performing a validation process such as the processes described above with respect to FIGS. 3, 4, 7, and 8, may generate a report or notification 904 indicating results of the validation process. The reporter notification 904 may be provided to a requestor 906 who provided a request to validate one or more sets of rules, as described herein. The report 904 may be stored and retrieved from data storage, such as a report database 907, in association with one or more of the sets of rules and/or the input sets used for validation. As described above with respect to FIG. 3, for example, the validation service 902 may also retrieve the sets of rules and/or optimized input sets for generating a report 904.

The report data for may include an indication of the sets of rules used for testing, an indication of an output corresponding to each set of rules used for testing, an indication of the optimized input set used for generating the respected outputs, or an assessment of an output produced. The report 904 may be organized according to any appropriate format such as by row and column, by text, by picture, or by some combination thereof. The report data for may include one or more static elements presenting information with which the user may not directly interact, and may include one or more features with which the user may interact. The report 904 depicted in diagram 900, for example, includes a first set of rules 908 that is a set of rules assumed to be valid or that was previously assessed as being a valid set of rules. A second set of rules 910 is a set of rules that is currently being tested or validated. One or more input sets 912 correspond to the optimized input sets provided from a data optimization and management service, such as the service described above with respect to FIG. 3. A first output 914 provides an indication of one or more outputs respectively generated using the one or more input sets as an input to the first set of rules 908. A second output 916 provides an indication of one or more outputs respect to generated using the one or more input sets as an input to the second set of rules 910.

The report 904 may include an assessment 918 indicating an assessment of the second output 916 in view of the first output 914. For example, information for a first test 920 in a first set of tests testing the validity of the second set of rules 910 uses an optimized input set comprising a set of inputs {A1, B1} as an input to the first set of rules V1 (e.g., a first version of the rules) and an input to the second set of rules V2 (e.g., a second version of the rules) respectively generates a first output 914 of 1.5 and a second output 916 of 1.5. Because the first output 914 and a second output 916 match, the validation service 902 may determine that the second set of rules 910 generated a valid result, and provide an indication of the assessment 918 indicating the valid result. As another example, information for a second test 922 uses an optimized input set comprising a set of inputs {A2, B1} as an input to the first set of rules V1 and input to the second set of rules V2, respectively producing a first output of 6.7 and a second output of −1.7. The validation service 902, based on the information for the second test 922 may provide an assessment 918 that the results are invalid—for example, because a negative result was produced where a positive result should have been achieved.

The report 904 may include a summary 924 summarizing one or more results of the validation test. The summary 924 may indicate a number of valid results, each corresponding to a match between the first output 914 and the second output 916. The summary 924 may also indicate a number of invalid results generated in the first test, where each invalid result is a result of the second output 916 being an invalid or unacceptable result of the set of inputs applied to the second set of rules 910—for example, where the second output 916 diverges from the first output 914 by more than a predetermined amount (e.g., a standard deviation, a specified number), or where an implausible result is achieved (e.g., negative number, zero, excessively large number). The summary 924 may indicate a number of warnings or suspicious results that were produced as a result of the set of inputs applied to the second set of rules 910. The warnings may correspond to the second output 916 having a result that diverges or is different from the first output 914, such as a value 18.35 for the second result 916 where a value 18.3 was produced as a first output 914, as shown in the diagram 900.

The validation service 902 may perform one or more actions as a result of a validation test comprising a set of tests. In one example, the validation service 902 may automatically determine that the second set of rules 910 has failed validation based on one or more conditions. One condition that may correspond to a validation failure for a set of rules is a determination that an invalid or implausible result has been produced. As reflected in the report 904, for instance, the validation service 902 performed an action 926 rejecting the second set of rules V2 because the validation service 902 determined that the second set of rules 910 comprising the second version of the set of rules V2 produced an invalid result. The validation service 902 may identify one or more inconsistent results and enable a user to determine whether to validate the set of rules be tested based on the results of the report 904. For instance, in a second set of tests testing the validity of the second set of rules 910 (i.e., third version of the rules V3), as depicted in the diagram 900, the validation service 902 determined that a potentially inconsistent result occurred because the second output 916 for the second set of rules 910 was 18.8 whereas the first output 914 for the first set of rules 908 was 18.3. The validation service 902 accordingly generated an indication 930 of a potentially consistent result in the report 904.

The validation service 902 may also generate, based on the potentially inconsistent result, an interactive object 928 enabling the user to either accept the second set of rules 910 as valid, or reject the second set of rules 910 as invalid. The user clicking on the 'accept' or 'reject' may cause a response 932 to be generated and provided from the requestor 906 to the validation service 902, the response 932 including information indicating whether the second set of rules 910 is valid or invalid. Although the interactive object 928 in diagram 900 is indicated as being part of the report for, the interactive object 928 may instead be included in a different content provided to the user, such as a dialog box, email, or other appropriate communication or notification to which the user can respond. The validation service 902 may, in response to receiving the response 932, store information associated with the second set of rules 910 indicating whether the set of rules is valid or invalid. The service provider may disallow, discontinue, delete, or otherwise making accessible set of rules that has been determined to be invalid. Alternatively, the validation service 902 may determine that set of rules being tested is valid if no valid results are produced, or in response to receiving an indication from the user that the set of rules is valid. Based on the determination that set of rules is valid, the validation service 902 may cause information to be stored in association with the set of rules being tested indicating the validity of the set of rules. The service provider may determine that the set of rules being tested should therefore be a preferred set of rules replacing the previous set of rules, or otherwise indicate or accept the validity of the set of rules.

Figure 10:
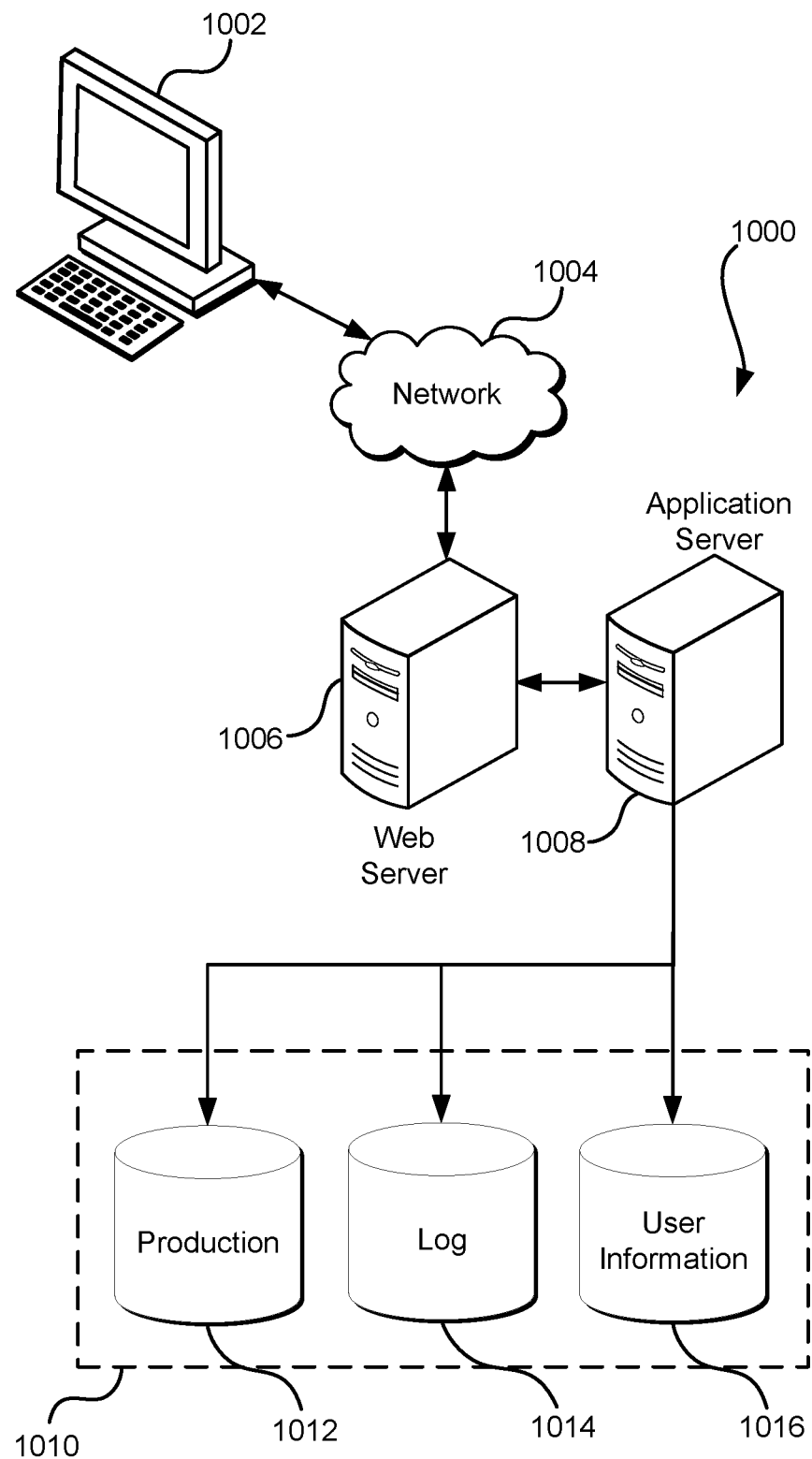
FIG. 10 shows an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages, or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store", "data storage", or "memory" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 1002 and the application server 1008, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1010 can include several separate data tables, databases, data documents, dynamic data storage schemes and/or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. The application server 1008 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C # or C++, or any scripting language, such as Ruby, PHP, Perl, Python or TCL, as well as combinations thereof. The server(s) may also include database servers, including without limitation those commercially available from Oracle®, Microsoft®, Sybase and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   obtaining information comprising:
      a first set of data indicating a first version of a set of rules related to performance of an automated workflow, the set of rules, encoded to be processed by one or more computing devices, to cause the automated workflow to generate at least one output at least based on the set of rules;
      a second set of data indicating a second version of the set of rules; and
      domain data involved in performing the automated workflow, the domain data comprising a first set of domain objects and a second set of domain objects;
   obtaining a set of inputs comprising, for a first domain object in the first set of domain objects, an input associated with a second domain object in the second set of domain objects;
   generating a first output by at least evaluating the set of inputs using the first version of the set of rules;
   generating a second output by at least evaluating the set of inputs using the second version of the set of rules;
   determining, by at least comparing the first output with the second output, a different consequence of the first version and the second version; and
   generating a notification indicating a difference between the first version and the second version as a result of determining the different consequence.

2. The computer-implemented method of claim 1, wherein the set of rules relate to producing a value for an output parameter in the automated workflow, wherein evaluation of the set of rules using an input from the set of inputs produces the value for the output parameter.

3. The computer-implemented method of claim 1, wherein the inputs of the set of inputs are disjoint data structures.

4. The computer-implemented method of claim 1, wherein the set of inputs are inputs that were recorded as being previously used as inputs for performing the automated workflow process.

5. A system, comprising:
   one or more processors; and
   memory that stores computer-executable instructions that, if executed, cause the one or more processors to:
      obtain a plurality of input combinations generated from sets of domain objects, the domain objects associated with performance of an automated workflow process to be executed by a computing device, execution of the automated workflow process to cause the automated workflow process to perform an operation based on a set of rules including logic that defines a function of the automated workflow process;
      obtain a version of a rule file including logic specifying one or more aspects for performance of the automated workflow process;
      determine that the version of the rule file produces a different result than a different version of the rule file for one or more of the plurality of input combinations; and
      indicate a potential inconsistency associated with the version of the rule file based at least on the different result.

6. The system of claim 5, wherein the sets of input combinations respectively include a domain object from a plurality of domains contained in the set of domain objects.

7. The system of claim 5, wherein the plurality of input combinations are generated from a cross product of at least a first disjoint data set with a second disjoint data set.

8. The system of claim 5, wherein each of the plurality of inputs comprise a first domain object from a first set of domain objects and a second domain object from a second set of domain objects exclusive of the first set of domain objects.

9. The system of claim 5, further comprising generating a notification indicating the different result, and providing the notification to an entity requesting validation of the version of the rule.

10. The system of claim 9, wherein the notification includes an interactive object the version of the rule file contains operational logic that is different than operational logic contained in the previous rule file.

11. The system of claim 5, wherein the version of the rule file involves a numerical value related to performance of the automated workflow process than a corresponding numerical value in the previous version of the rule file.

12. The system of claim 5, wherein the system determines that the version of the rule file is invalid based at least in part on the different result.

13. A non-transitory computer-readable storage medium having stored thereon executable instructions that, as a result of being executed by one or more processors of a computer system, cause the computer system to at least:
   obtain a plurality of input sets, each input set generated from a combination of an element from a first set with an element from a second set;
   obtain a first version of a set of rules for performing an automated workflow process and a second version of the set of rules for performing the automated workflow process, the set of rules encoded to be processed by one or more computing devices, and the set of rules including logic to cause the automated workflow process to perform an operation constrained by the set of rules;

cause production of a plurality of first outputs using one or more of the plurality of input sets as input to the first version;

cause production of a plurality of second outputs using the one or more of the plurality of input sets as input to the second version; and based at least in part on a determination that one or more of the plurality of second outputs does not match one or more corresponding first outputs of the plurality of first outputs, generate a record indicating an inconsistency between the first version and the second version.

14. The non-transitory computer-readable storage medium of claim 13, wherein obtaining the plurality of input sets includes sending a request to a service of a computing resource service provider causing the service to generate the plurality of input sets based at least on obtaining a cross product of a plurality of disjoint input sets.

15. The non-transitory computer-readable storage medium of claim 14, wherein the input sets are generated from one or more data arrays storing previous inputs for the automated workflow process.

16. The non-transitory computer-readable storage medium of claim 13, wherein causing production of the first output and the second output includes causing the computer system to submit the plurality of input sets, the first version of the set of rules, and the second version of the set of rules to a distributed processing system separate from the computer system.

17. The non-transitory computer-readable storage medium of claim 13, wherein automated workflow process involves performance of one or more operations in accordance with the set of rules by one or more services of a service provider.

18. The non-transitory computer-readable storage medium of claim 17, wherein performance of the one or more operations are for conducting a network-based transaction via a service of the service provider.

19. The non-transitory computer-readable storage medium of claim 18, wherein the determination that one or more of the plurality of second outputs does not match the one or more corresponding first outputs is based at least in part on determining a correspondence between each of the first outputs and each of the second outputs according to the input set used as input to the set of rules, and comparing the first outputs with the corresponding second outputs.

20. The non-transitory computer-readable storage medium of claim 13, wherein causing production of the first output or the second output is in response to receiving a request to validate a version of the set of rules.

* * * * *